US011412051B1

(12) United States Patent
Chiganmi et al.

(10) Patent No.: US 11,412,051 B1
(45) Date of Patent: Aug. 9, 2022

(54) SYSTEM AND METHOD FOR CONNECTING VIRTUAL NETWORKS IN A BRANCH SITE TO CLOUDS

(71) Applicant: Cisco Technology, Inc., San Jose, CA (US)

(72) Inventors: Avinash Ashok Kumar Chiganmi, Fremont, CA (US); Venkatraman Venkatapathy, Fremont, CA (US); Giorgio Valentini, Walnut Creek, CA (US); Madhuri Kolli, San Jose, CA (US); Shu-Fen Lee, San Jose, CA (US); Balaji Sundararajan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/377,315

(22) Filed: Jul. 15, 2021

Related U.S. Application Data

(60) Provisional application No. 63/172,211, filed on Apr. 8, 2021.

(51) Int. Cl.
*G06F 15/16* (2006.01)
*H04L 67/141* (2022.01)
*H04L 45/02* (2022.01)
*H04L 12/46* (2006.01)

(52) U.S. Cl.
CPC ........ *H04L 67/141* (2013.01); *H04L 12/4641* (2013.01); *H04L 45/02* (2013.01)

(58) Field of Classification Search
CPC .... H04L 67/141; H04L 12/4641; H04L 45/02
USPC .......................................... 709/227
See application file for complete search history.

(56) References Cited

U.S. PATENT DOCUMENTS

| | | | |
|---|---|---|---|
| 10,715,419 | B1 | 7/2020 | Suryanarayana et al. |
| 2016/0088092 | A1* | 3/2016 | Cardona-Gonzalez ...... H04W 4/60 709/227 |
| 2017/0012870 | A1* | 1/2017 | Blair ....................... H04L 45/04 |
| 2018/0198669 | A1 | 7/2018 | Fargano et al. |
| 2018/0227369 | A1* | 8/2018 | DuCray ................ G16H 40/20 |
| 2019/0103993 | A1 | 4/2019 | Cidon et al. |
| 2020/0120166 | A1 | 4/2020 | Cardona-Gonzalez et al. |
| 2020/0396121 | A1 | 12/2020 | Kumar et al. |

* cited by examiner

*Primary Examiner* — Anthony Mejia
(74) *Attorney, Agent, or Firm* — Polsinelli PC

(57) ABSTRACT

The present technology is directed to controlling and managing resources both in Software-Defined Cloud Interconnect (SDCI) providers and cloud service providers via a single network controller and further connecting virtual networks in a branch site to virtual networks in the cloud service providers. A network controller can establish a network gateway in an SDCI provider, establish a cross-connectivity between the network gateway in the SDCI provider and one or more clouds, group one or more virtual networks in the one or more clouds and one or more virtual networks in a branch site into a tag, and establish a connection between the one or more virtual networks in the one or more clouds and the one or more virtual networks in the branch site using the tag.

20 Claims, 12 Drawing Sheets

SYSTEM AND METHOD FOR CONNECTING VIRTUAL NETWORKS IN A BRANCH SITE TO CLOUDS

CROSS-REFERENCE TO RELATED APPLICATIONS

This application claims priority to U.S. Provisional Patent Application No. 63/172,211 filed on Apr. 8, 2021, the content of which is incorporated herein by reference in its entirety.

TECHNICAL FIELD

The subject matter of this disclosure relates in general to the field of computer networking, and more particularly, to systems and methods for controlling and managing resources both in Software-Defined Cloud Interconnect (SDCI) providers and cloud service providers via a network controller and connecting virtual networks in a branch site to virtual networks in the cloud service providers.

BACKGROUND

Enterprises have been adopting business-critical and other cloud applications in the form of Software as a Service (SaaS) and Infrastructure as a service (IaaS). As the traditional wide-area network (WAN) cannot handle an explosion of traffic accessing cloud-based applications, enterprises have turned to a Software-Defined Wide Area Network (SD-WAN), which is a virtual WAN architecture that provides connectivity, management, and services between data centers and remote branches or cloud instance. However, as businesses have widely adopted multi-cloud environments, managing and controlling various network providers and multiple connections between a branch site to clouds have become complicated and time-consuming.

BRIEF DESCRIPTION OF THE DRAWINGS

Illustrative embodiments of the present application are described in detail below with reference to the following figures.

DETAILED DESCRIPTION

Figure 1:
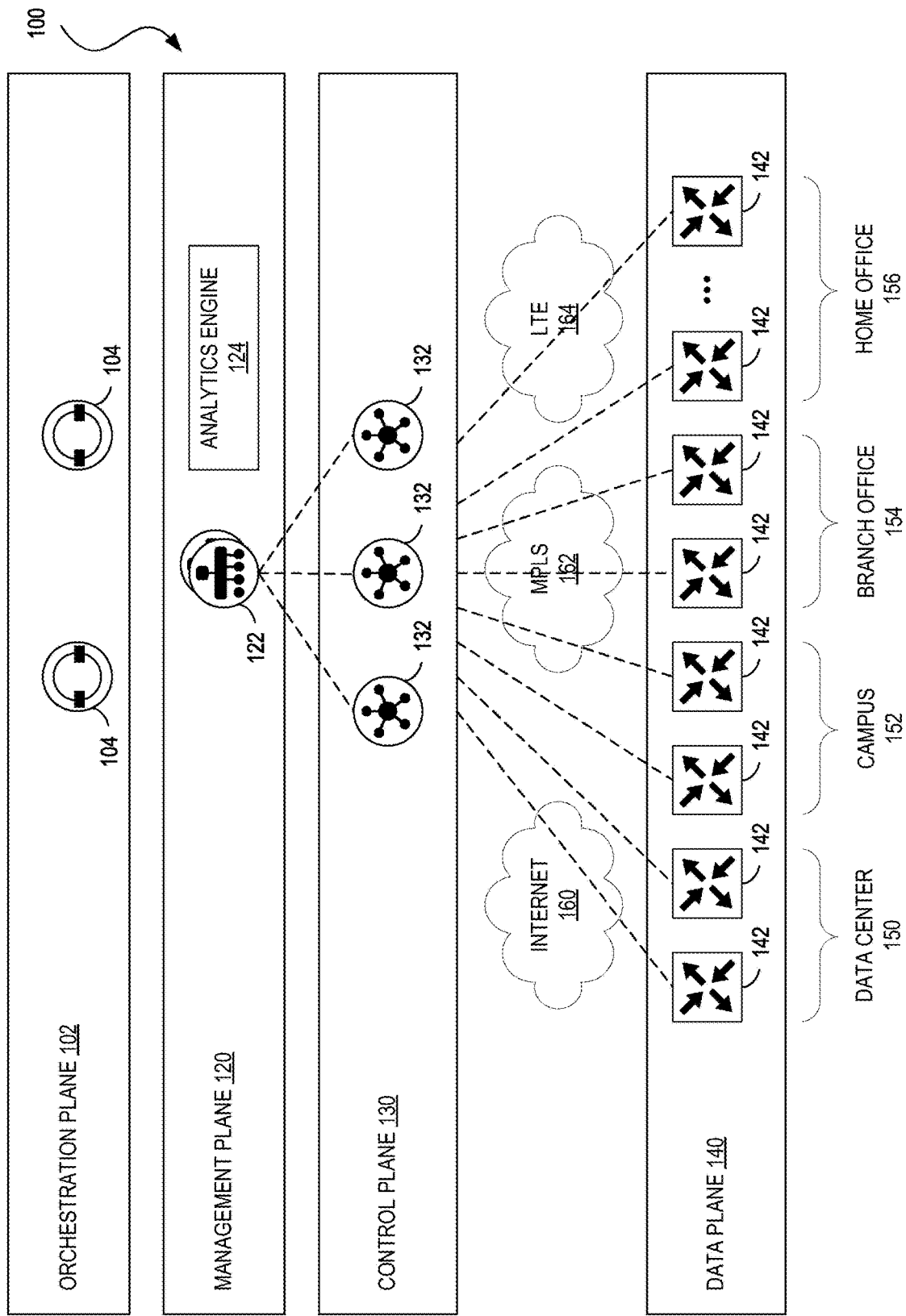
FIG. 1 illustrates an example of a high-level network architecture in accordance with some examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As emerging technologies such as 5G and the Internet of Things (IoT) become more closely integrated with clouds, enterprises have an increasing need to integrate the cloud with enterprise branches. To overcome the challenges of securely connecting to cloud deployments in SD-WAN, an SDCI platform has been developed to enable cloud interconnects to connect enterprise SD-WAN sites to the cloud. A Software-Defined Cloud Interconnect (SDCI) can provide an optimized tool for directly and securely interconnecting clouds, networks, and internet service providers. Using SDCI, users (e.g., enterprises) can control over routing, switching, and security of every connection without deploying an individual network appliance for each tenant.

However, as businesses have widely adopted multi-cloud environments, managing and controlling various network providers and multiple connections between a branch site to clouds have become complicated and time-consuming. In some cases, users have to access different portals to establish connectivity between cloud resources and their on-premises (or branch) network using multiple SDCI providers. Therefore, there exists a need for an orchestrator (e.g., network controller) that can dynamically control and manage resources both in SDCI providers and cloud service providers. There is also a strong need for a single integrated workflow for a user to configure a connection between a branch site and a cloud.

The present technology includes systems, methods, and computer-readable media for solving these problems and discrepancies, among others. In some examples, systems, methods, and computer-readable media are provided for dynamically controlling and managing resources in both SDCI providers and cloud service providers using a network controller.

Overview

Systems, methods, and computer-readable media are provided for controlling and managing resources both in SDCI providers and cloud service providers via a network controller and connecting virtual networks in a branch site to virtual networks in the cloud service providers.

According to at least one example of the present technology, a network controller can establish a network gateway in an SDCI provider, establish a cross-connectivity between the network gateway in the SDCI provider and one or more clouds, group one or more virtual networks in the one or more clouds and one or more virtual networks in a branch site into a tag, and establish a connection between the one or more virtual networks in the one or more clouds and the one or more virtual networks in the branch site using the tag. Also, the network controller can standardize parameters associated with the SDCI provider. The parameters determining attributes of the network gateway can include a software image, a Border Gateway Protocol (BGP) autonomous system number (ASN), a size of a virtual network, and an interconnect transit color.

Furthermore, the one or more virtual networks in the one or more clouds and the one or more virtual networks in the branch site can be grouped into the tag based on one or more characteristics associated with the one or more virtual networks in the one or more clouds and the one or more virtual networks in the branch site.

The connection between the one or more virtual networks in the one or more clouds and the one or more virtual networks in the branch site can be based on the cross-connectivity between the network gateway in the SDCI provider and the one or more clouds.

The connection between the one or more virtual networks in the one or more clouds and the one or more virtual networks in the branch site can be based on an automated BGP routing configuration.

The cross-connectivity between the network gateway in the SDCI provider and the one or more clouds and the connection between the one or more virtual networks in the one or more clouds and the one or more virtual networks in the branch site can be via an application programming interface (API).

A system for establishing a site-to-site connection between a branch site and a cloud service provider can include one or more processors and at least one computer-readable storage medium storing instructions which, when executed by the one or more processors, cause the one or more processors to establish a network gateway in an SDCI provider, establish a cross-connectivity between the network gateway in the SDCI provider and one or more clouds, group one or more virtual networks in the one or more clouds and one or more virtual networks in a branch site into a tag, and establish a connection between the one or more virtual networks in the one or more clouds and the one or more virtual networks in the branch site using the tag.

A non-transitory computer-readable storage medium having stored therein instructions which, when executed by one or more processors, can cause the one or more processors to establish a network gateway in an SDCI provider, establish a cross-connectivity between the network gateway in the SDCI provider and one or more clouds, group one or more virtual networks in the one or more clouds and one or more virtual networks in a branch site into a tag, and establish a connection between the one or more virtual networks in the one or more clouds and the one or more virtual networks in the branch site using the tag.

DESCRIPTION

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively, or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
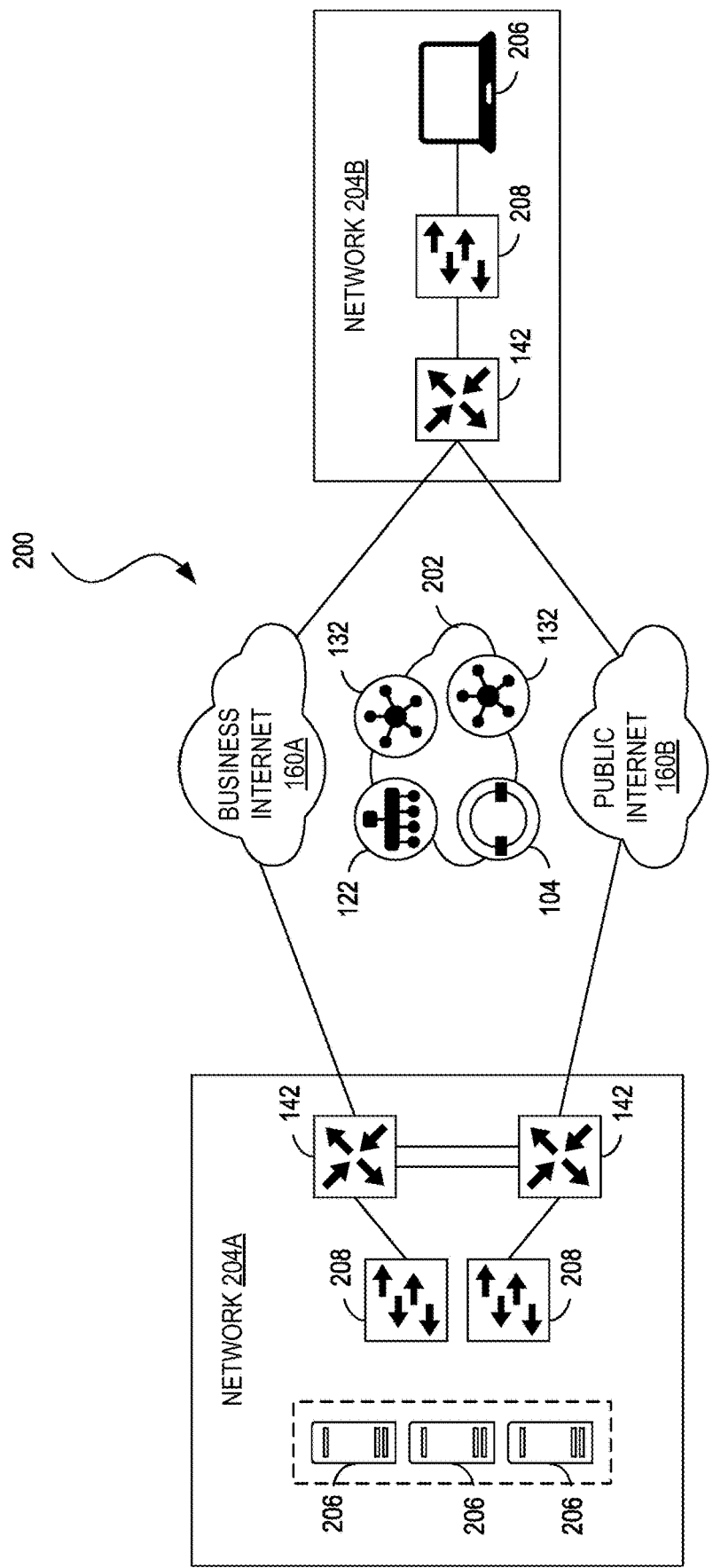
FIG. 2 illustrates an example of a network topology in accordance with some examples of the present disclosure.

FIG. 2 illustrates an example of a network topology 200 showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B. Moreover, in other examples, the network topology 200 can include a different number of network sites, transport networks, devices, and/or networks/components than those shown in FIG. 2.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
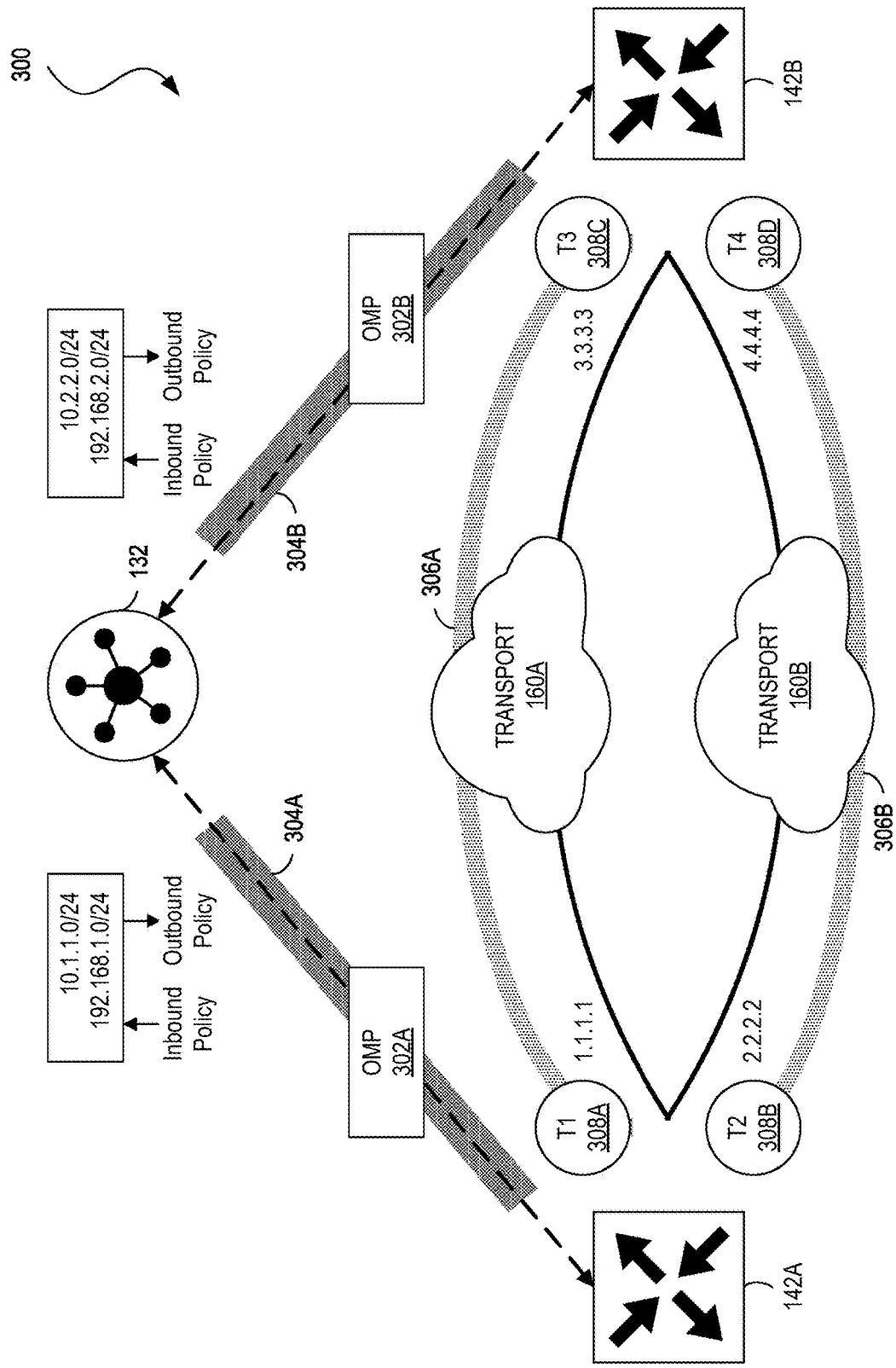
FIG. 3 illustrates an example of a diagram showing the operation of a protocol for managing an overlay network in accordance with some examples of the present disclosure.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
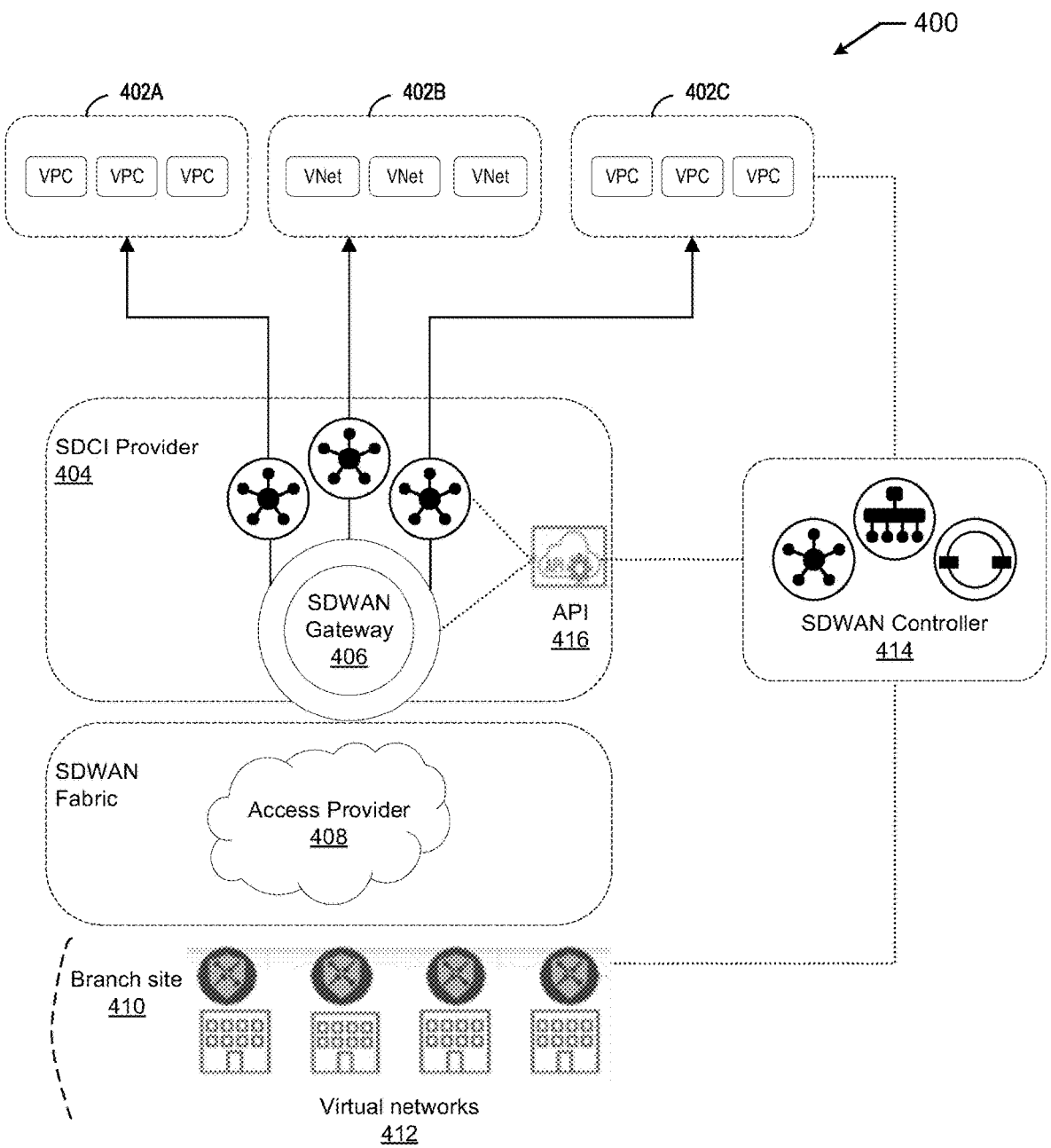
FIG. 4 illustrates an example diagram of an integrated workflow to establish a site-to-site connection between clouds and a branch site in accordance with some examples of the present disclosure.

FIG. 4 illustrates an example diagram of an integrated workflow 400 for establishing a site-to-cloud connection between a cloud and a branch site using a network controller in accordance with some examples of the present disclosure. In some examples, integrated workflow 400 comprises one or more cloud service providers 402A, 402B, and 402C (collectively, 402), SDWAN gateway 406 at SDCI provider 404, access provider 406, virtual networks 412 (e.g., VRFs) at branch site 410, and SDWAN controller 414 where connections between cloud service providers 402, SDWAN gateway 406, and SDWAN controller 414 are established via API 416.

In some instances, examples of the virtual networks in cloud service providers 402 can include, but are not limited to, virtual private clouds (VPCs) hosted by Amazon Cloud or Google Cloud, virtual networks (VNets) hosted by Azure, or any type of virtual network that can be provided by a cloud service provider.

Furthermore, in some examples, examples of virtual networks at branch site 410 can include, but are not limited to, Virtual Routing and Forwarding (VRFs) or any other virtual routing domain/network.

SDWAN controller 414 can dynamically control and manage resources of cloud service providers 402 and SDCI provider 404 in a single integrated workflow 400 to connect one or more virtual networks (e.g., VPCs or VNets) in cloud service providers 402 with virtual networks 412 (e.g., VRFs) at branch site 410.

Furthermore, integrated workflow 400 can automate a BGP routing configuration to propagate routes or prefixes to allow communication between endpoints and/or devices in branch site 410, SDCI provider 404, and/or one or more of cloud service providers 402, and/or between endpoints and/or devices in one or more virtual networks or routing domains (e.g., VPCs, VNets, VRFs, etc.) hosted by branch site 410 and/or one or more of the cloud service providers 402.

In some instances, SDWAN controller 414 can control and manage a network path from branch site 410 to an edge router instantiated in SDCI provider 404, and further to virtual networks in cloud service providers 402.

Figure 5:
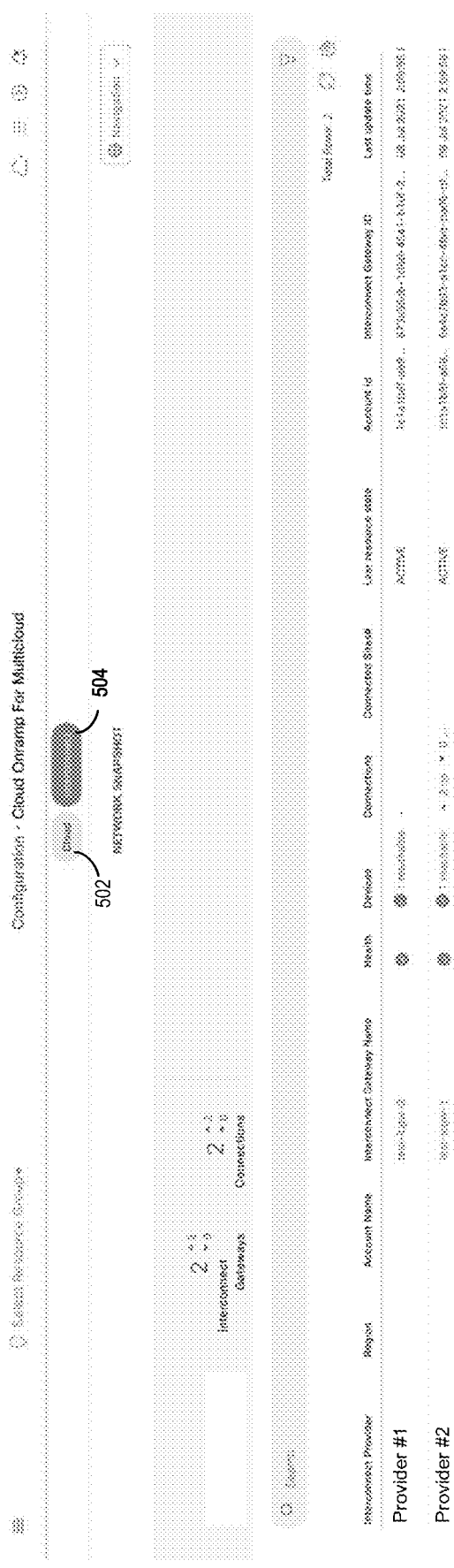
FIG. 5 illustrates an example display of a dashboard for managing end-to-end connectivity in accordance with some examples of the present disclosure.

FIG. 5 illustrates an example display of a dashboard 500 for managing end-to-end connectivity in accordance with an embodiment. In some embodiments, dashboard 500 can be an initial page that provides an overview of a network controller's (e.g., SDWAN controller 414 in FIG. 4) management and control system. For example, dashboard 500 can provide an overview of the entire system including all the connections, gateways, SDCI providers, and cloud service providers.

In some examples, cloud tab 502 provides a list of cloud service providers (e.g., cloud service providers 402 in FIG. 4). Also, interconnect tab 504 provides a list of available interconnect providers (e.g., SDCI providers 404 in FIG. 4). For a particular SDCI provider, the initial page of dashboard 500 can provide details relating to the SDCI provider such as a region, an account name, an interconnect gateway name, devices, connections, last resource state, an account ID, an interconnect gateway ID, or last update time.

In some examples, dashboard 500 further comprises setup stage 506, discover stage 508, manage stage 510, and intent management stage 512. Details regarding each stage are further discussed below with respect to FIGS. 6-9.

In some instances, setup stage 506 provides interconnect account details such as an interconnect provider (e.g., SDCI provider 404 in FIG. 4), an account name, a description, a user name, and/or a password. In some examples, a network controller (e.g., SDWAN controller 414 in FIG. 4) can internally make an API call (i.e., a call to a server using APIs) to the interconnect provider (e.g., SDCI provider 404 in FIG. 4) to validate credentials of the interconnect account details.

Each interconnect provider can have one or more different types of APIs. The network controller (e.g., SDWAN controller 414 in FIG. 4) can aggregate data relating to every type of APIs into a common intra-type solution so that multiple APIs, regardless of types, can be managed by a single network controller.

In some embodiments, setup stage 506 can provide various locations, regions, or partner ports that are available for each SDCI provider, which is associated with a user's account. An interconnect gateway (e.g., SDWAN gateway 406 in FIG. 4) can be brought up to establish a connection at those available locations.

Figure 6:
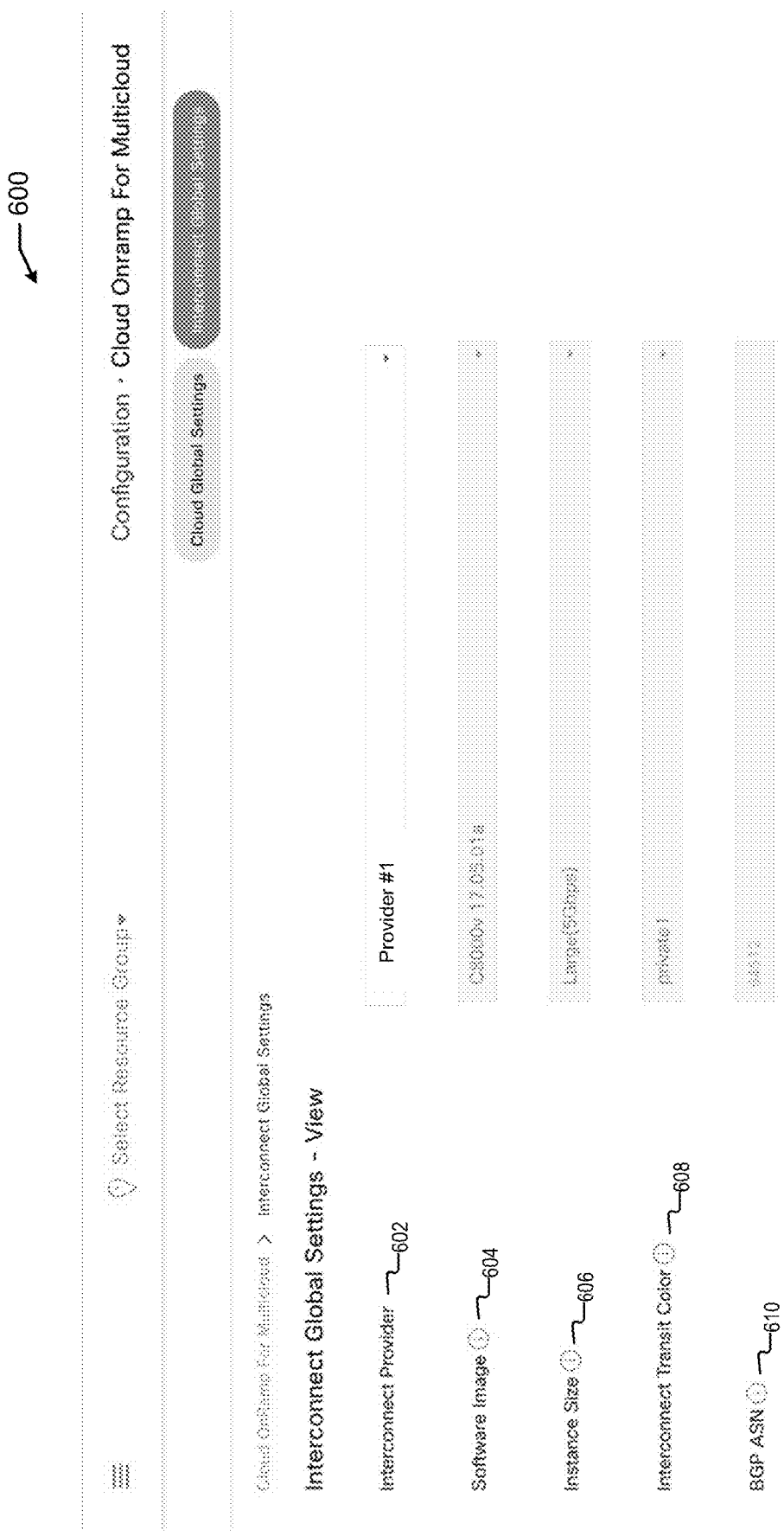
FIG. 6 illustrates an example display of an interconnect global setting stage in accordance with some examples of the present disclosure.

FIG. 6 illustrates an example display of an interconnect global setting stage 600 in accordance with some examples of the present disclosure. In some examples, interconnect global setting stage 600 comprises deployment properties such as software image 604, instance size 606, interconnect transit color 608, and BGP ASN 610 for interconnect provider 602. For example, software image 604 includes a list of available SDWAN images for SDWAN cloud service routers in the interconnect providers (e.g., SDCI provider 404 as illustrated in FIG. 4). Software image 604 can be used to bring up the interconnect gateway (e.g., SDWAN gateway 406 as illustrated in FIG. 4) as a default option if a custom setting is not chosen. Also, instance size 606 can include a list of flavors of virtual machine (VM) instance properties, for example, which can be broadly classified as small, medium, and large. Users can choose instance size 606 based on a number of virtual central processing units (vCPUs), memory, and bandwidth. Furthermore, interconnect transit color 608 is a SDWAN tunnel color, which can be used to bring up a site-to-site connection between two interconnect gateways brought up in an interconnect provider (e.g., SDCI provider 404 as illustrated in FIG. 4). A bidirectional forwarding direction (BFD) session can be formed over the specific tunnel interface. Also, BGP ASN 610 is an autonomous system number configured on the interconnect gateway (e.g., SDWAN gateway 406 as illustrated in FIG. 4) as a default option when connectivity to cloud is provisioned.

Such global settings can simplify future deployment and use of the particular interconnect provider when a gateway is to be instantiated. In some instances, global settings can be overwritten when an individual gateway needs to be adjusted. Also, the network controller (e.g., SDWAN controller 414 in FIG. 4) can apply the common parameters across every SDCI provider associated with the same account.

Figure 7:
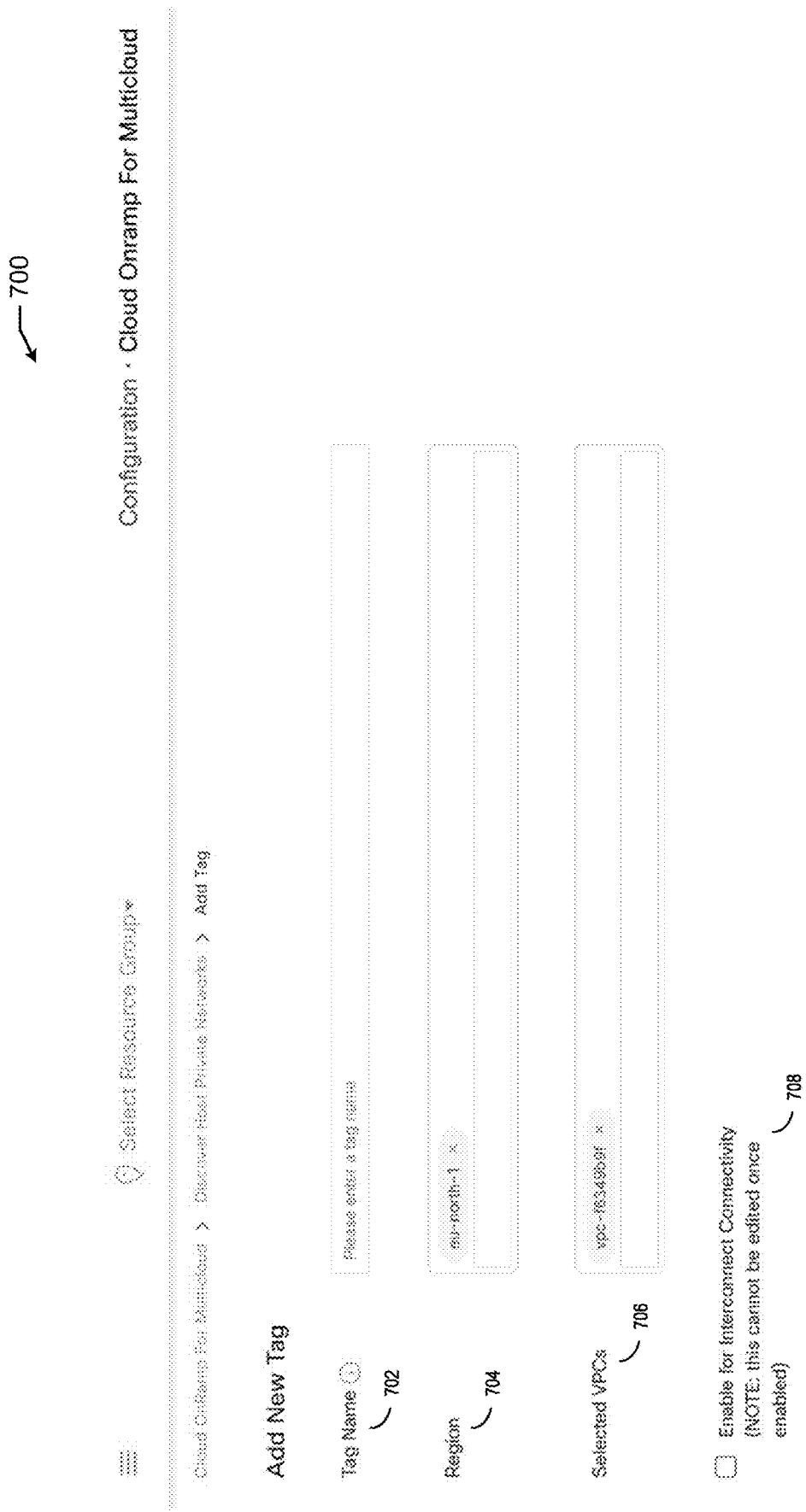
FIG. 7 illustrates an example display of a tag stage in accordance with some examples of the present disclosure.

FIG. 7 illustrates an example display of a tag stage 700 in accordance with some examples. In some instances, under a discover stage (e.g., discover stage 508 in FIG. 5), parameters for the resources on the cloud side (e.g., cloud service providers 402 in FIG. 4) can be determined. Such parameters can include, for example, a cloud region, an account name, a host virtual network (e.g., VPC, etc.) name, a host virtual network (e.g., VPC, etc.) tag, an interconnect status (e.g., enabled or not), an account ID, and/or a host virtual network (e.g., VPC) identifier (ID).

In some examples, one of the parameters that can be determined under the discover stage is a concept called "tag." As shown in FIG. 7, tag stage 700 comprises tag name 702, region 704, selected virtual networks (e.g., VPCs) 706, an option for enabling an interconnect connectivity 708, etc. A plurality of virtual networks can be grouped into a "tag." The tag allows the interconnections and application of global policies for the distinct virtual networks, which could have different requirements and/or constraints imposed by the different cloud service providers. For example, multiple virtual networks (e.g., VPCs, VNets, VRFs) can be tagged into a logical group. When a connection is brought up from a branch site (e.g., branch site 410 in FIG. 4) to a tag, the connection enables traffic to flow from the branch site to the tag including multiple virtual networks. In particular, tagging across different regions can simplify configuring interconnections between the virtual networks on the cloud side and the branch site.

In some instances, virtual networks in the branch site (e.g., VRFs) can be grouped into a "tag" in a similar manner. For example, multiple virtual networks (e.g., VRFs) in the branch site can be tagged into a logical group so that the traffic can flow from the tag in the branch site to cloud service providers via the connection between them. In some examples, a tag(s) corresponding to one or more virtual networks in the branch site can be mapped to and/or associated with a tag(s) corresponding to one or more virtual networks on one or more cloud service providers. In some cases, one or more virtual networks in the branch site and one or more virtual networks on one or more cloud service providers can be grouped into a same tag.

Figure 8:
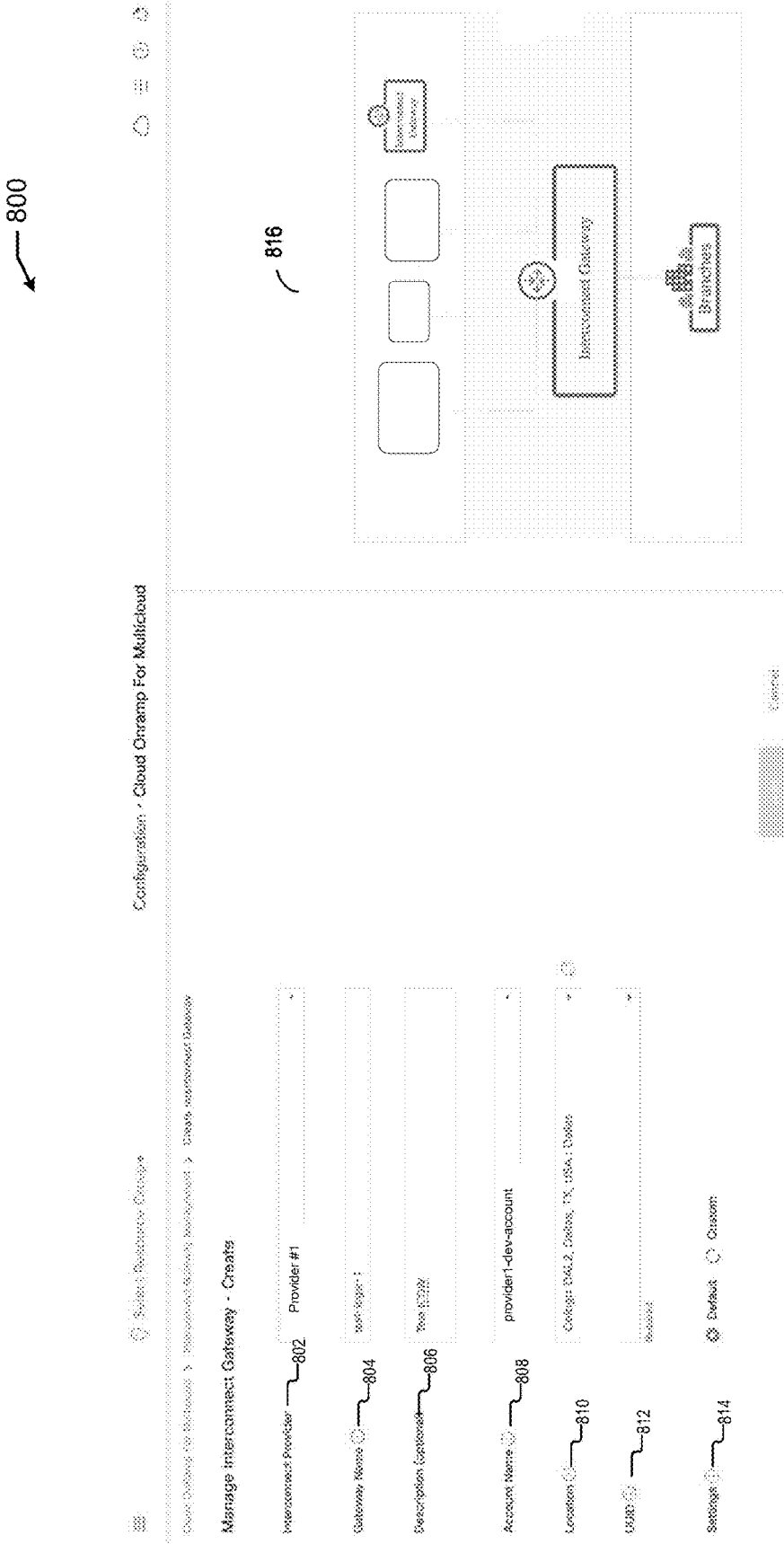
FIG. 8 illustrates an example display of a stage for creating and managing interconnect gateway in accordance with some examples of the present disclosure.

FIG. 8 illustrates an example display of stage 800 for creating and managing an interconnect gateway in accordance with some examples of the present disclosure. In some examples, the network controller (e.g., virtual networks 412 in FIG. 4) can manage interconnect gateways, e.g., routers that are brought up in the SDCI provider (e.g., SDCI provider 404 in FIG. 4). For example, the network controller can establish an interconnect gateway (e.g., SDWAN gateway 406 in FIG. 4) in an SDCI provider (e.g., SDCI provider 404 in FIG. 4) to establish a cross-connectivity between the interconnect gateway in the SDCI provider and one or more clouds (e.g., virtual networks in cloud service providers 402 in FIG. 4).

In some examples, creating and managing an interconnect gateway on stage 800 comprises determining, for a particular interconnect provider 802, one or more parameters including gateway name 804, description 806, account name 808, location 810, Universally Unique Identifier (UUID) 812, and setting 814 (e.g., by default or customized). In some examples, UUID 812 can be a chassis ID that can be selected by a user.

Furthermore, in some instances, once all the parameters are determined, an API (e.g., API 416 in FIG. 4) can be invoked to create and configure an SDCI gateway (e.g., SDWAN gateway 406 in FIG. 4) within the SDCI location (e.g., SDCI provider 404 in FIG. 4). Pane 816 on the left side of stage 800 provides a graphical representation of creating and managing an interconnect gateway. For example, pane 816 can visualize connectivity between the interconnect gateway and virtual networks in cloud service providers and connections between the branch site and the cloud service providers. In some instances, pane 816 can auto-populate, based on the configuration information, the visualization of connectivity between the interconnect gateway and virtual networks in cloud service providers and connections between the branch site and the cloud service providers.

Figure 9:
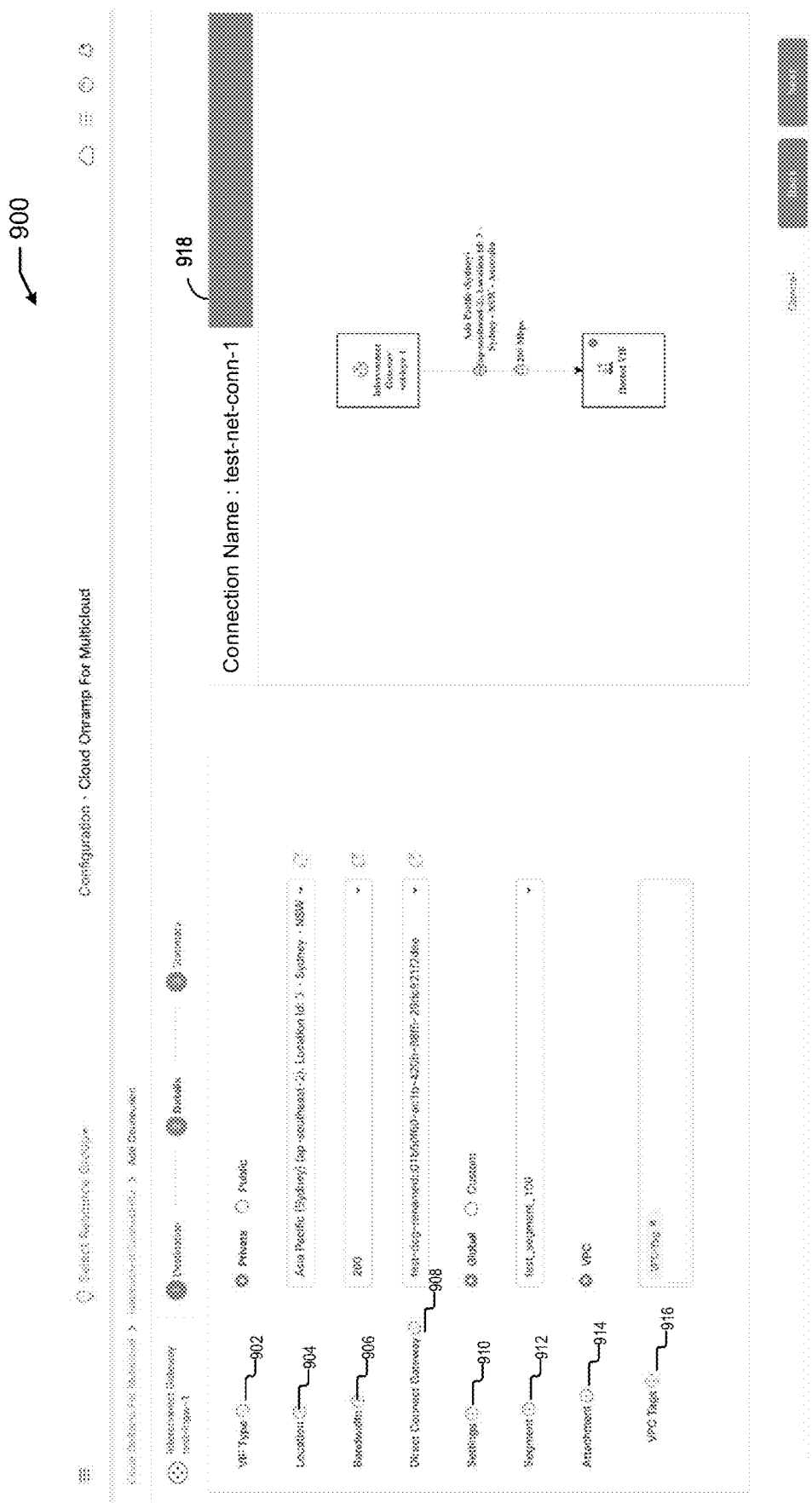
FIG. 9 illustrates an example display of a stage for creating and configuring connectivity between an SDCI provider and a cloud service provider in accordance with some examples of the present disclosure.

FIG. 9 illustrates an example display of stage 900 for creating and configuring connectivity between an SDCI provider and a cloud service provider in accordance with some examples of the present disclosure. In some examples, stage 900 for creating and configuring connectivity between an SDCI provider (e.g., SDCI provider 404 in FIG. 4) and a cloud service provider (e.g., cloud service providers 402 in FIG. 4) comprises virtual interface (VIF) type 902, location 904, bandwidth 906, direct connect gateway 908, settings 910, segment 912 (e.g., VPN or VRF), attachment 914, or virtual network (e.g., VPC) Tags 916. Segment 912 refers to a number of segments to reach a particular cloud resource from the branch site. In some examples, an SD-WAN design can be based on the use of VPN or any other tunneling protocol to segment the routing table. For example, segment-300 means that a user has a VPN 300 set up on the SDWAN router in the branch site, which also refers to the size of traffic that is allowed to reach the particular cloud resource.

In some instances, each SDCI provider has an entry point into cloud service providers with a different speed, functionality, etc., available for a particular location or region.

In some examples, connection pane 918 can auto-populate and visualize the logical representation of the connection from the branch site to the cloud service providers and the cross-connectivity between the network gateway in the SDCI provider and the cloud service providers. In some examples, an individual connection can be visualized separately for each gateway.

Figure 10:
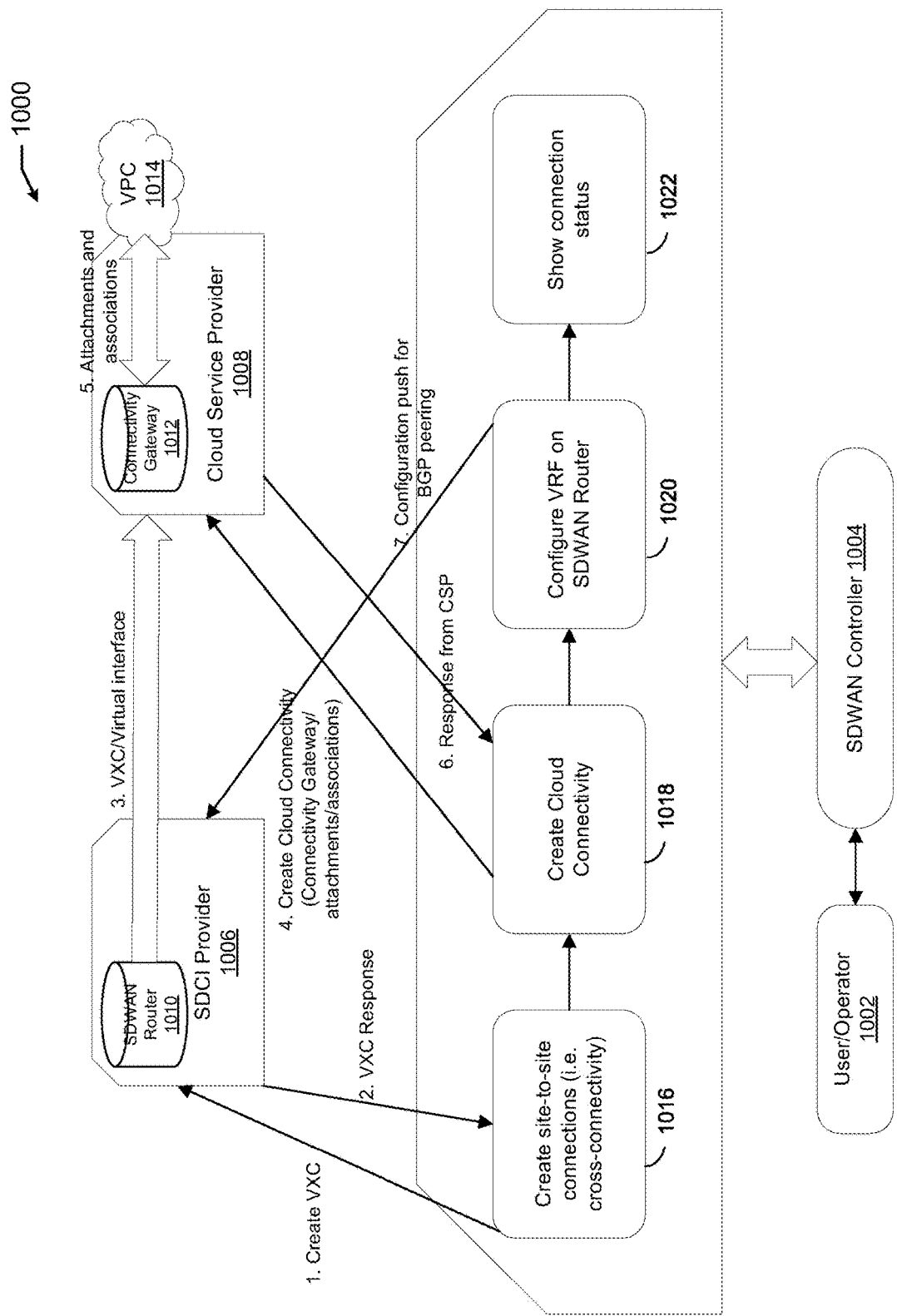
FIG. 10 illustrates an example diagram of a workflow for connecting an SDCI provider and a cloud service provider in accordance with some examples of the present disclosure.

FIG. 10 illustrates an example diagram of a workflow 1000 for connecting SDCI provider 1006 and cloud service provider 1008 via SDWAN controller 1004 (e.g., Cisco vManage) for user/operator 1002 in accordance with some examples of the present disclosure. Even though workflow 1000 in FIG. 10 involves single connectivity with a single API call, multiple connectivity can be managed and controlled in a similar manner as described in workflow 1000.

As a single network controller (e.g., SDWAN controller 1004) can control and/or manage the entire system including resources in SDCI providers, cloud service providers, and branch site, steps for configuring multiple connections within the system can be simplified. In some examples, SDCI provider 1006 can create site-to-site connections (e.g., cross-connectivity) at step 1016. The direct Layer 2 connection from an interconnect gateway (e.g., connectivity gateway 1012) to a cloud onramp or another interconnect gateway can be called a Virtual Cross Connect (VXC). Based on the creation of VXC and VXC response, an underlay within an SDCI provider fabric can be established.

In some instances, a virtual interface can be used to connect SDWAN router 1010 in SDCI provider 1006 to connectivity gateway 1012 in cloud service provider 1008. Once the virtual network interface (VIF) has been attached to connectivity gateway 1012 in cloud service provider 1008, a BGP session can be established between the interconnect gateway in SDCI provider 404 and connectivity gateway 1012. This establishes underlay connectivity from the interconnect gateway to connectivity gateway 1012 in cloud service provider 1008 via SDCI fabric. The virtual networks (e.g., VPCs 1014 or VNets) in cloud service providers 1008 are associated to the necessary cloud service provider gateway constructs (e.g., Transit Gateway/Virtual Private Gateway in AWS, Express Route Gateway/Virtual Network Gateway in Azure) based on the type of a connection (private, public or transit). Also, the interconnect gateway can be associated and attached to connectivity gateway 1012 where the VIF has been attached. SDWAN controller 1004 can manage and configure the routing table and prefix advertisements to and from the virtual networks (e.g., VPCs 1014 or VNets) in cloud service providers 1008.

In some examples, at step 1018, SDWAN controller 1004 can create cloud connectivity based on a response from cloud service provider 1008 regarding resources available for connection in cloud service provider 1008.

In some instances, at step 1020, SDWAN controller 1004 can configure virtual networks (e.g., VRFs) on SDWAN router 1010 in SDCI provider 1006. Once all the connections are established and configurations are validated, SDWAN controller 1004 can provide the status of every connection within the system.

Figure 11:
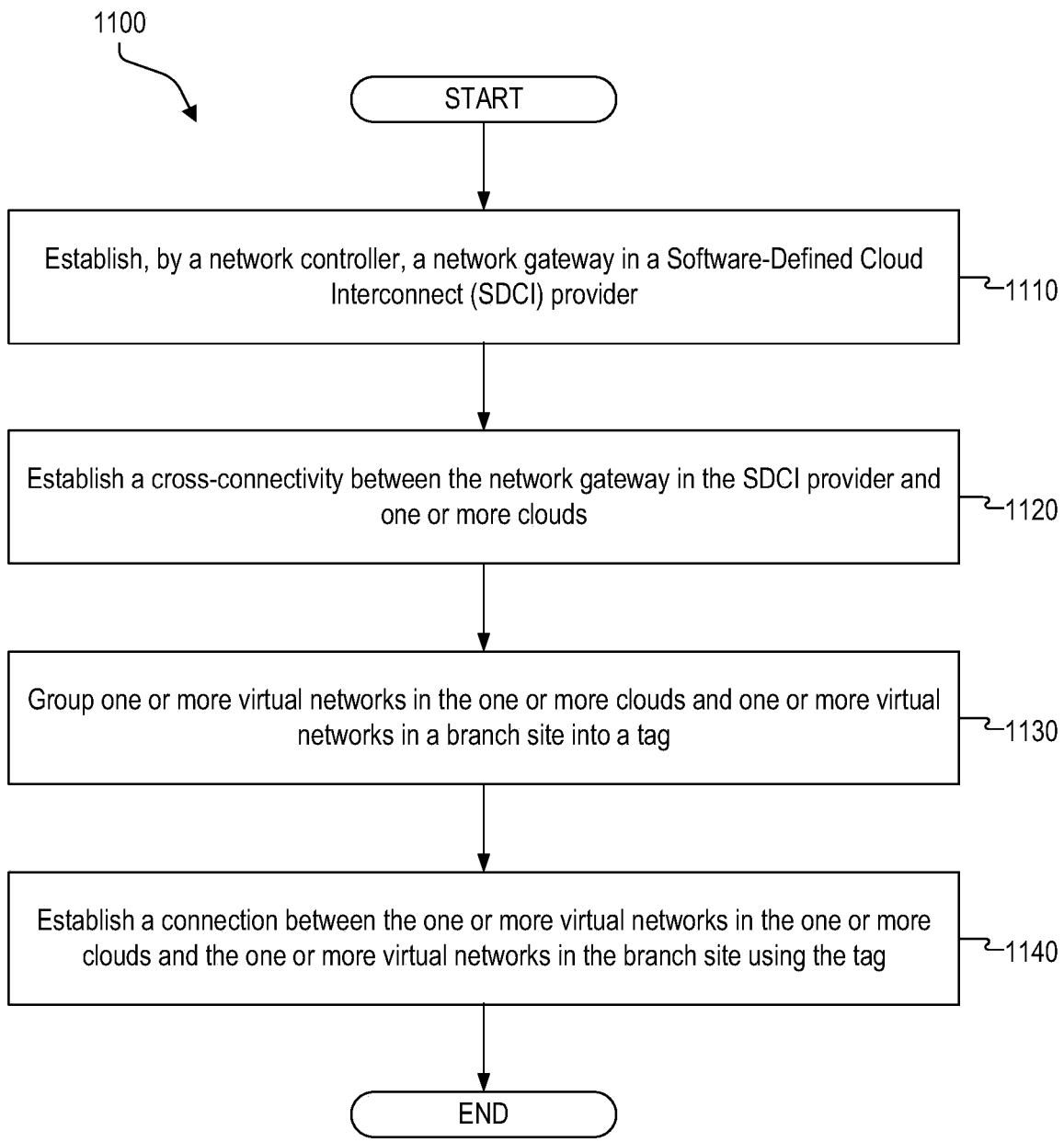
FIG. 11 illustrates a flowchart of a method for controlling and managing resources both in SDCI providers and cloud service providers via a single network controller and further connecting virtual networks in a branch site to virtual networks in the cloud service providers in accordance with some examples of the present disclosure.

FIG. 11 illustrates a flowchart of a method 1100 for controlling and managing resources both in SDCI providers and cloud service providers via a single network controller and further connecting virtual networks in a branch site to virtual networks in the cloud service providers in accordance with some examples of the present disclosure.

Although example method 1100 depicts a particular sequence of operations, the sequence may be altered without departing from the scope of the present disclosure. For example, some of the operations depicted may be performed in parallel or in a different sequence that does not materially affect the function of method 1100. In other examples, different components of an example device or system that implements the method 1100 may perform functions at substantially the same time or in a specific sequence.

In some examples, a network controller can establish a network gateway in an SDCI provider at step 1110. For example, SDWAN controller 414 in FIG. 4 can establish a network gateway in SDCI provider 404 in FIG. 4.

In some instances, at step 1120, the network controller can establish a cross-connectivity between the network gateway in the SDCI provider and one or more clouds. For example, SDWAN controller 414 can establish a cross-connectivity between SDWAN gateway 406 in SDCI provider 404 and the one or more virtual networks (e.g., VPCs, VNets, etc.) in cloud service providers 402 as illustrated in FIG. 4.

Furthermore, the connectivity between the network gateway in the SDCI provider and the one or more clouds can be established via an API. For example, the connectivity between SDWAN gateway 406 and the one or more virtual networks (e.g., VPCs or VNets) in cloud service providers 402 can be established via API 416 as illustrated in FIG. 4.

In some examples, the network controller can group one or more virtual networks in the one or more clouds and the one or more virtual networks in a branch site into a tag at step 1130. For example, SDWAN controller 414 can group one or more virtual networks (e.g., VPCs or VNets) in cloud service providers 402 and one or more virtual networks 412 (e.g., VRFs) in branch site 410 into a tag as depicted in FIG. 4. In some instance, such grouping into the tag can be based on one or more characteristics associated with the one or more virtual networks in the one or more clouds and the one or more virtual networks in the branch site. For example, virtual networks can be grouped as a tag based on characteristics such as region, account, application, or proximity to connectivity gateway.

In some embodiments, the network controller can establish a connection between the one or more virtual networks in the one or more clouds and the one or more virtual networks in the branch site using the tag at step 1140. For example, SDWAN controller 414 can establish a connection between the one or more virtual networks (e.g., VPCs or VNets) in cloud service providers 402 and virtual networks 412 (e.g., VRFs) in branch site 410 using the tag as illustrated in FIG. 4. In some instances, the connection between the one or more virtual networks in the one or more clouds and the one or more virtual networks in the branch site is based on the cross-connectivity between the network gateway in the SDCI provider and the one or more clouds. For example, the connection between the one or more virtual networks (e.g., VPCs or VNets) in cloud service providers 402 and virtual networks 412 (e.g., VRFs) in branch site 410 can be based on the cross-connectivity between SDWAN gateway 406 in SDCI provider 404 and the one or more virtual networks (e.g., VPCs or VNets) in cloud service providers 402 as depicted in FIG. 4.

Furthermore, in some examples, the connection between the one or more virtual networks in the one or more clouds and the one or more virtual networks in the branch site is based on an automated BGP routing configuration. For example, the connection between the one or more virtual networks (e.g., VPCs or VNets) in cloud service providers 402 and virtual networks 412 (e.g., VRFs) in branch site 410 can be based on automated BGP routing configuration.

In some examples, the connection between the one or more virtual networks in the one or more clouds and the one or more virtual networks in the branch site can be established via an API. For example, the connection between the one or more virtual networks (e.g., VPC or VNet) in cloud service providers 402 and virtual networks 412 in branch site 410 can be established via API 416.

In some examples, the network controller can standardize one or more parameters associated with the SDCI provider. For example, SDWAN controller 414 in FIG. 4 can standardize one or more parameters associated with SDCI provider 404. Such parameters can determine attributes of the network gateway (e.g., SDWAN gateway 406 in FIG. 4). Some examples of the parameters can include a software image, a BGP autonomous system number (ASN), a size of a virtual network, an interconnect transit color, among others.

In some examples, during the gateway creation, users do not have to configure parameters for each individual interconnect gateway once global settings have been defined. For example, the network controller (e.g., SDWAN controller 414 as illustrated in FIG. 4) can automatically apply these settings during the interconnect gateway instantiation.

In some instances, multiple SDCI providers can offer different approaches to creating connections. While some SDCI providers can mandate the primary and secondary connection in the same flow, in some examples in accordance with the present disclosure, standalone or redundant connection can be allowed through the workflows. When multiple connections are being brought up between a given interconnect gateway and different cloud service providers, the process of BGP ASN assignment and IP Pool addressing can be automated.

Figure 12:
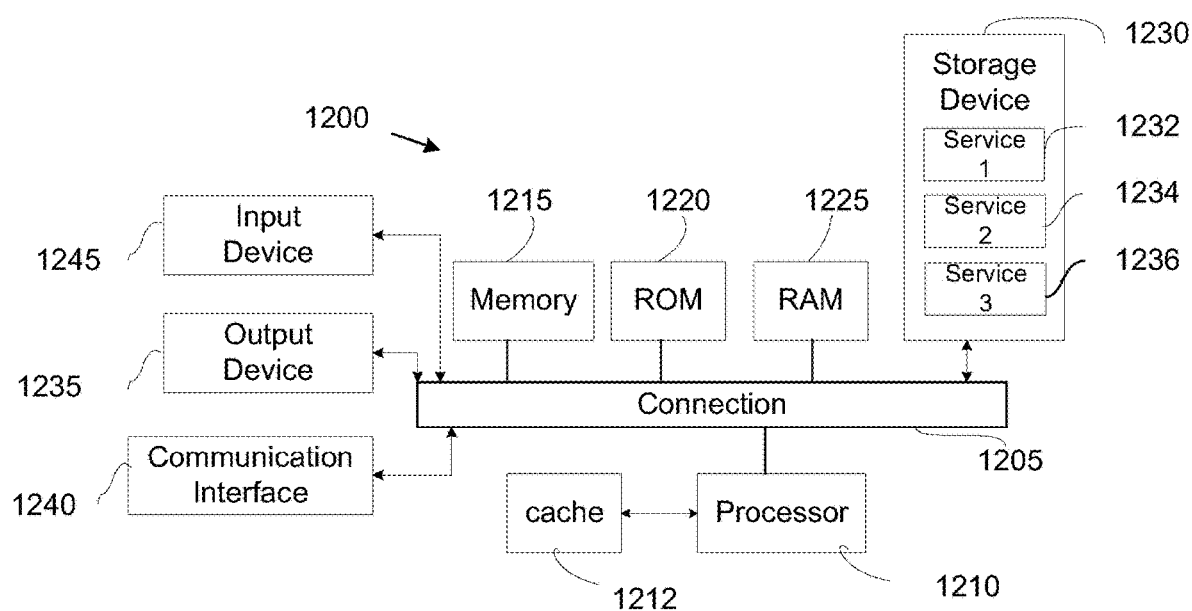
FIG. 12 shows an example computing system, which can be for example any computing device that can implement components of the system.

FIG. 12 illustrates an example computing system 1200 including components in electrical communication with each other using a connection 1205 upon which one or more aspects of the present disclosure can be implemented. Connection 1205 can be a physical connection via a bus, or a direct connection into processor 1210, such as in a chipset architecture. Connection 1205 can also be a virtual connection, networked connection, or logical connection.

In some embodiments computing system 1200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

Figure 13:
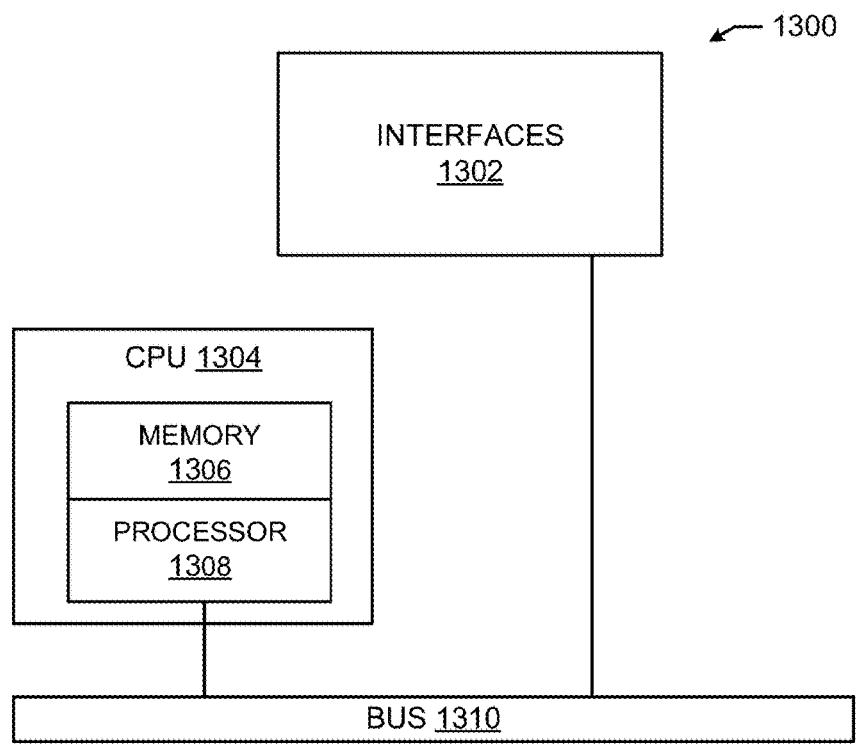
FIG. 13 illustrates an example network device.

FIG. 13 illustrates an example network device 1300 suitable for performing switching, routing, load balancing, and other networking operations. Network device 1300 includes a central processing unit (CPU) 1304, interfaces 1302, and a bus 1310 (e.g., a PCI bus). When acting under the control of appropriate software or firmware, the CPU 1304 is responsible for executing packet management, error detection, and/or routing functions. The CPU 1304 preferably accomplishes all these functions under the control of software including an operating system and any appropriate applications software. CPU 1304 may include one or more processors 1308, such as a processor from the INTEL X86 family of microprocessors. In some cases, processor 1308 can be specially designed hardware for controlling the operations of network device 1300. In some cases, a memory 1306 (e.g., non-volatile RAM, ROM, etc.) also forms part of CPU 1304. However, there are many different ways in which memory could be coupled to the system.

The interfaces 1302 are typically provided as modular interface cards (sometimes referred to as "line cards"). Generally, they control the sending and receiving of data packets over the network and sometimes support other peripherals used with the network device 1300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1304 to efficiently perform routing computations, network diagnostics, security functions, etc.

Although the system shown in FIG. 13 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1300.

Regardless of the network device's configuration, it may employ one or more memories or memory modules (including memory 1306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1306 could also hold various software containers and virtualized execution environments and data.

The network device 1300 can also include an application-specific integrated circuit (ASIC), which can be configured to perform routing and/or switching operations. The ASIC can communicate with other components in the network device 1300 via the bus 1310, to exchange data and signals and coordinate various types of operations by the network device 1300, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   establishing, by a network controller, a network gateway in a Software-Defined Cloud Interconnect (SDCI) provider;
   establishing a cross-connectivity between the network gateway in the SDCI provider and one or more clouds;
   grouping one or more virtual networks in the one or more clouds and one or more virtual networks in a branch site into a tag; and
   establishing a connection between the one or more virtual networks in the one or more clouds and the one or more virtual networks in the branch site using the tag.

2. The method of claim 1, wherein the one or more virtual networks in the one or more clouds and the one or more virtual networks in the branch site are grouped into the tag based on one or more characteristics associated with the one or more virtual networks in the one or more clouds and the one or more virtual networks in the branch site.

3. The method of claim 1, wherein the connection between the one or more virtual networks in the one or more clouds and the one or more virtual networks in the branch site is based on the cross-connectivity between the network gateway in the SDCI provider and the one or more clouds.

4. The method of claim 1, wherein the connection between the one or more virtual networks in the one or more clouds and the one or more virtual networks in the branch site is based on an automated Border Gateway Protocol (BGP) routing configuration.

5. The method of claim 1, wherein the cross-connectivity between the network gateway in the SDCI provider and the one or more clouds and the connection between the one or more virtual networks in the one or more clouds and the one or more virtual networks in the branch site are via an application programming interface (API).

6. The method of claim 1, further comprising:
   standardizing one or more parameters associated with the SDCI provider.

7. The method of claim 6, wherein, the one or more parameters determining attributes of the network gateway and being selected from a group consisting of: a software image, a BGP autonomous system number (ASN), a size of a virtual network, and an interconnect transit color.

8. A system comprising:
   a storage configured to store instructions;
   a processor configured to execute the instructions and cause the processor to:
     establish a network gateway in an SDCI provider;
     establish a cross-connectivity between the network gateway in the SDCI provider and one or more clouds;
     group one or more virtual networks in the one or more clouds and one or more virtual networks in a branch site into a tag; and
     establish a connection between the one or more virtual networks in the one or more clouds and the one or more virtual networks in the branch site using the tag.

9. The system of claim 8, wherein the one or more virtual networks in the one or more clouds and the one or more virtual networks in the branch site are grouped into the tag based on one or more characteristics associated with the one or more virtual networks in the one or more clouds and the one or more virtual networks in the branch site.

10. The system of claim 8, wherein the connection between the one or more virtual networks in the one or more clouds and the one or more virtual networks in the branch site is based on the cross-connectivity between the network gateway in the SDCI provider and the one or more clouds.

11. The system of claim 8, wherein the connection between the one or more virtual networks in the one or more clouds and the one or more virtual networks in the branch site is based on an automated BGP routing configuration.

12. The system of claim 8, wherein the cross-connectivity between the network gateway in the SDCI provider and the one or more clouds and the connection between the one or more virtual networks in the one or more clouds and the one or more virtual networks in the branch site are via an API.

13. The system of claim 8, further comprising:
    standardize one or more parameters associated with the SDCI provider.

14. The system of claim 13, wherein, the one or more parameters determining attributes of the network gateway and being selected from a group consisting of: a software image, a BGP ASN, a size of a virtual network, and an interconnect transit color.

15. A non-transitory computer readable medium comprising instructions, the instructions, when executed by a computing system, cause the computing system to:
    establish a network gateway in an SDCI provider;
    establish a cross-connectivity between the network gateway in the SDCI provider and one or more clouds;
    group one or more virtual networks in the one or more clouds and one or more virtual networks in a branch site into a tag; and
    establish a connection between the one or more virtual networks in the one or more clouds and the one or more virtual networks in the branch site using the tag.

16. The computer readable medium of claim 15, wherein the one or more virtual networks in the one or more clouds and the one or more virtual networks in the branch site are grouped into the tag based on one or more characteristics associated with the one or more virtual networks in the one or more clouds and the one or more virtual networks in the branch site.

17. The computer readable medium of claim 15, wherein the connection between the one or more virtual networks in the one or more clouds and the one or more virtual networks in the branch site is based on the cross-connectivity between the network gateway in the SDCI provider and the one or more clouds.

18. The computer readable medium of claim 15, wherein the connection between the one or more virtual networks in the one or more clouds and the one or more virtual networks in the branch site is based on an automated BGP routing configuration.

19. The computer readable medium of claim 15, wherein the cross-connectivity between the network gateway in the SDCI provider and the one or more clouds and the connection between the one or more virtual networks in the one or more clouds and the one or more virtual networks in the branch site are via an API.

20. The computer readable medium of claim 15, wherein the computer readable medium further comprises instructions that, when executed by the computing system, cause the computing system to:
    standardize one or more parameters associated with the SDCI provider.

\* \* \* \* \*